May 17, 1960 H. McKINNEY McLEARN 2,936,993
CONTAINER FILLING AND WEIGHING APPARATUS
Filed Feb. 29, 1956 9 Sheets-Sheet 6
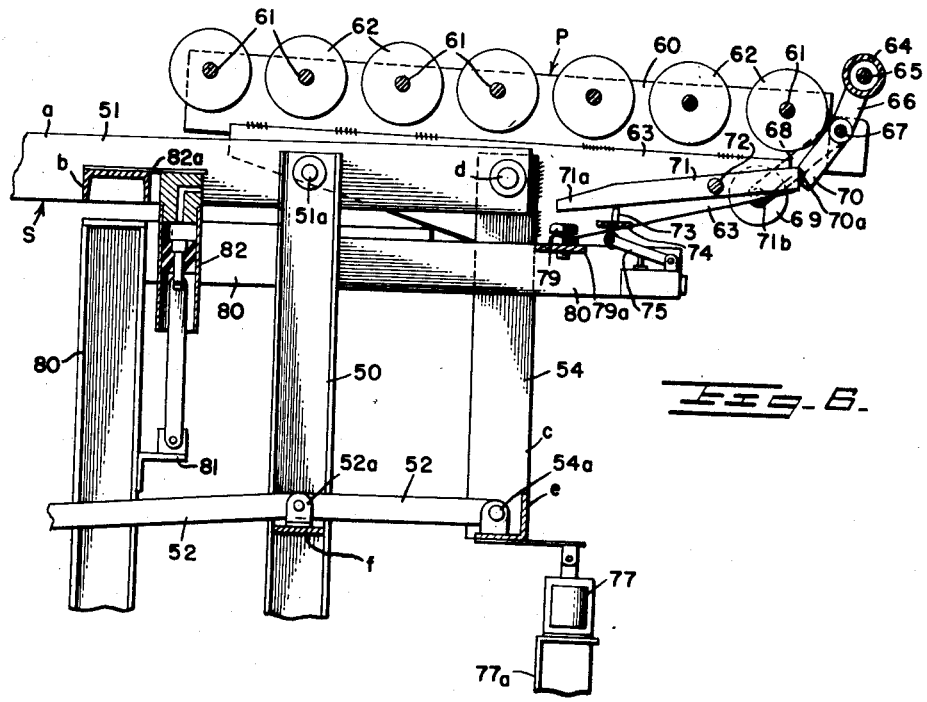
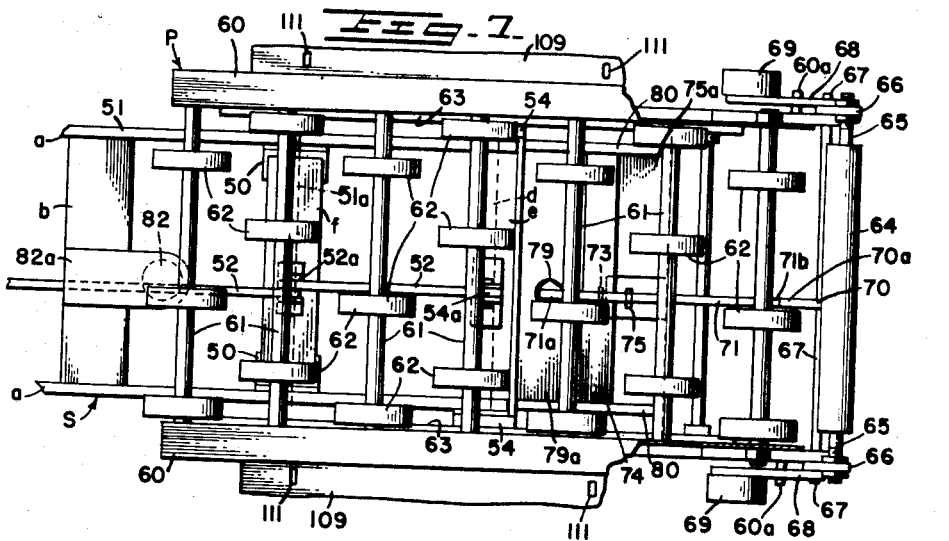
INVENTOR
HERBERT McKINNEY McLEARN
ATTORNEY May 17, 1960  H. McKINNEY McLEARN  2,936,993
CONTAINER FILLING AND WEIGHING APPARATUS
Filed Feb. 29, 1956  9 Sheets-Sheet 7
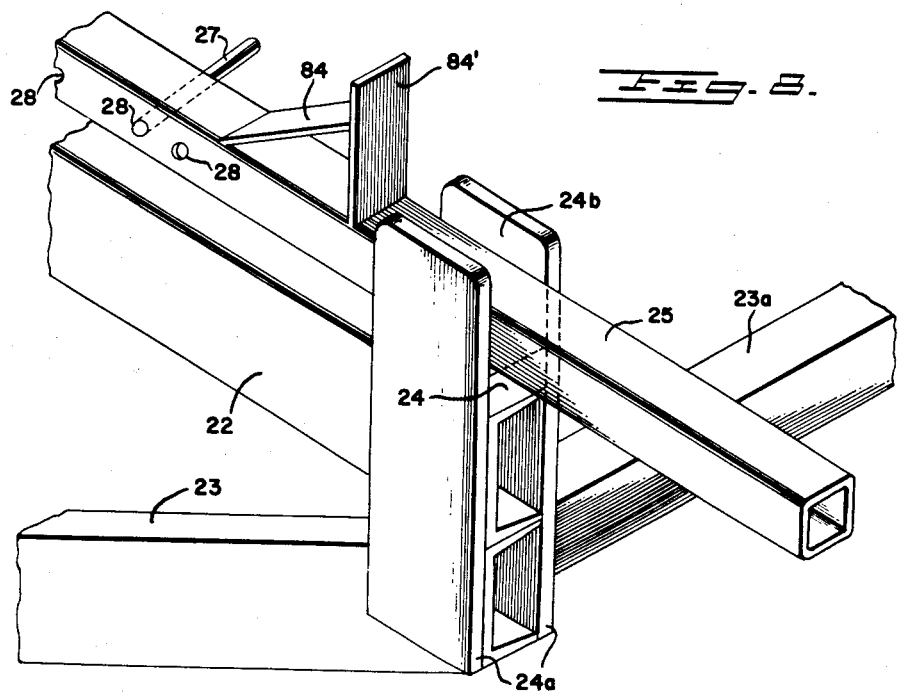
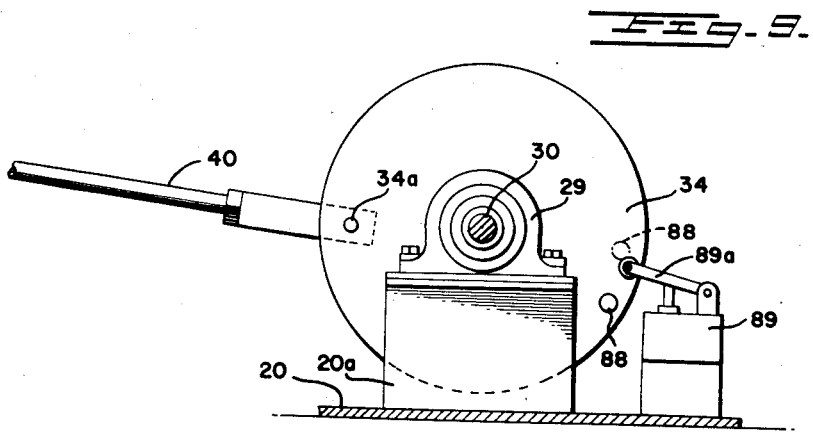
INVENTOR
HERBERT McKINNEY McLEARN
BY
ATTORNEY

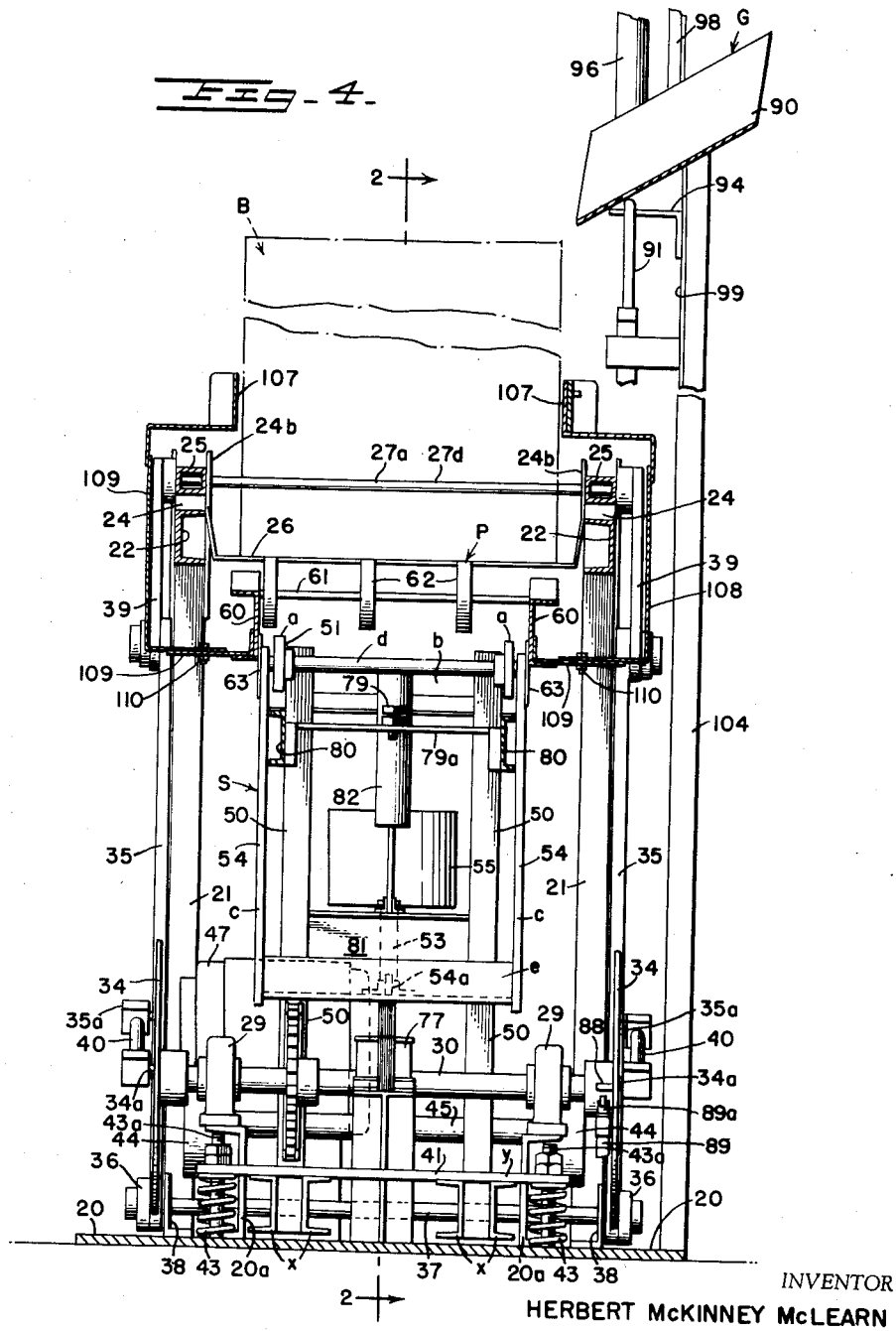

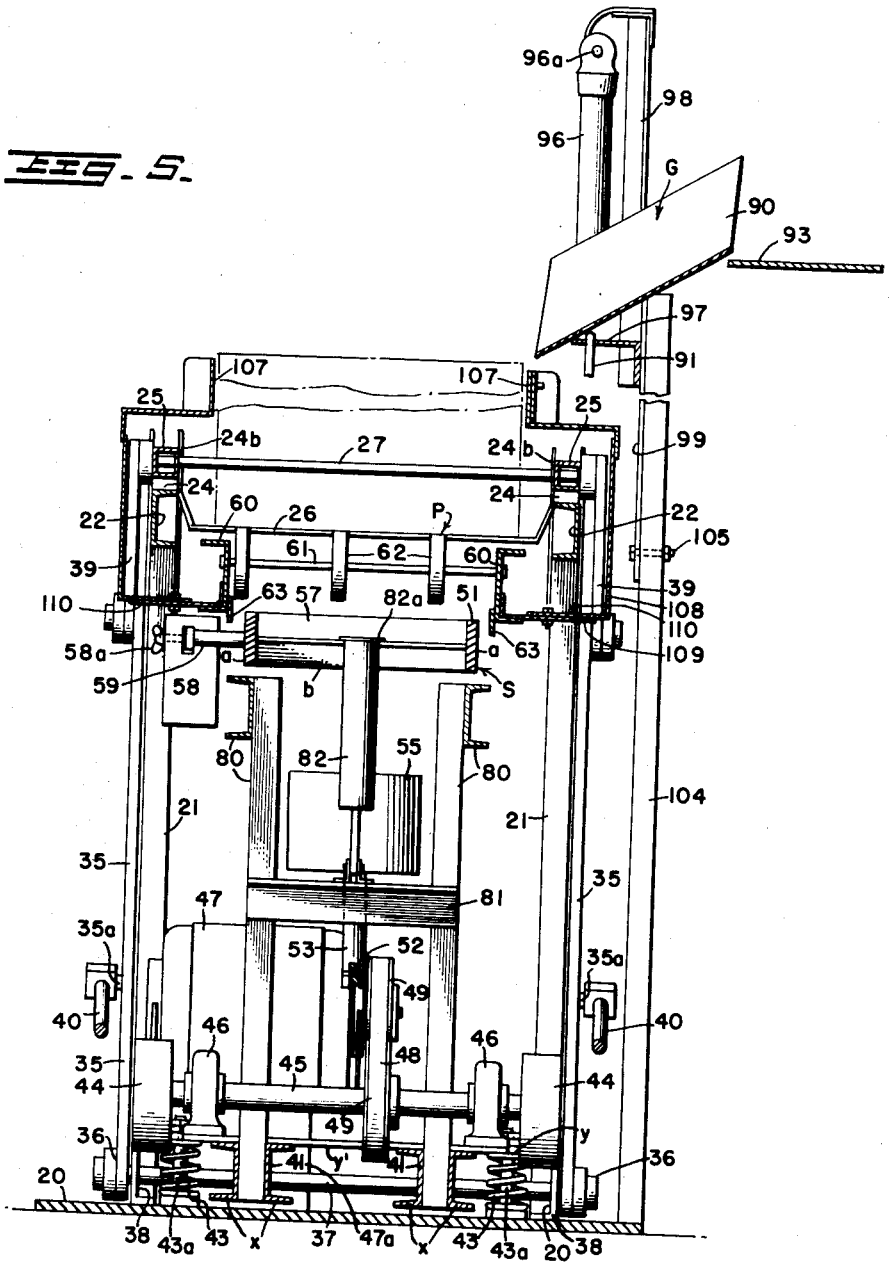

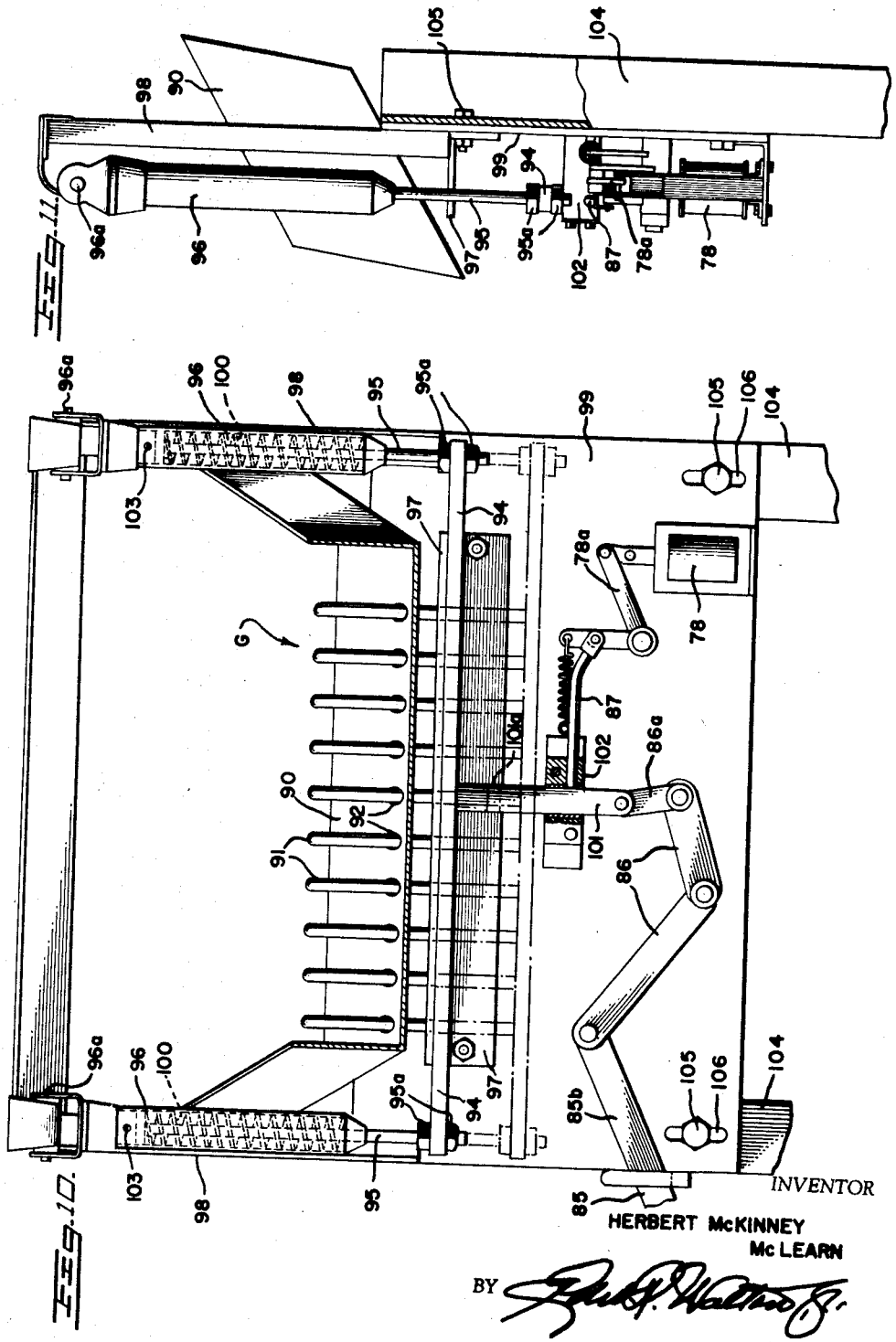

United States Patent Office 2,936,993
Patented May 17, 1960

2,936,993
CONTAINER FILLING AND WEIGHING APPARATUS

Herbert McKinney McLearn, Seminole County, near Maitland, Fla., assignor to American Machinery Corporation, Fairvilla, Fla., a corporation of Florida Application February 29, 1956, Serial No. 568,556

14 Claims. (Cl. 249—59)

The present invention relates to a container filling and weighing apparatus and, more particularly, to such an apparatus useful in a production-line for packing boxes or like containers with solid articles, as distinguished from liquids, such as, for instance, fruits and vegetables, although it may be applicable for the packing of certain manufactured products.

The volume of vegetables and fruits, packed in boxes or containers for handling, transportation and/or storage, has created for a considerable time a need for a fast and accurate mechanism for filling and weighing boxes, baskets or other containers in order to keep pace with the output of a treating production-line in the modern packing-house where, at the present time, most bulk filling is done by placing one or more containers below a chute leading from a distributing belt and from which chute the product is fed by gravity. In some instances, the flow of the product to the container, after it is filled, is cut off or held back manually until the container is replaced by another container; in other instances, the flow is directed alternately, by a diversion means, to a second container after one has been filled; and sometimes, in either case, the container rests upon a scale as it is being filled or is only visually checked for approximate weight and then later scale-weighed. However, these methods and means now employed are relatively slow and time-consuming and the accuracy of the weight of a filled container is dependent upon the attendant's ability and celerity in performing the necessary operations, resulting in wide variations in the weight of the contents of the filled containers ready for the next operation of closing. Furthermore, by feeding into a container by gravity spherical, elliptical or other irregular shaped produce or articles of relatively large size (such as normally encountered with fruits and vegetables), larger pockets or voids are formed between them than is the case when hand packed; thus, when the content of the container is brought to accurate weight, the product extends above the rim of the container forming an unusually high "crown" so that, when the cover is forced down thereupon in closing the container, some of the product is damaged.

Having in mind the above and other defects and deficiencies of the prior art, the main aim or object of the present invention is to provide an improved fully automatic container-filling-and-weighing apparatus which feeds containers to a filling-and-weighing station which, after being filled and accurately weighed, are automatically removed and replaced, thus eliminating all mental determination and manual operation with respect to the weight of the containers and the movement of the container to the filling station and from the filling station, resulting in increased speed of packing, more accurate weight content in the containers and in the packing operation keeping abreast with delivery of the product from the treating production-line.

A further object of the invention is to incorporate in such an apparatus a very simple and effective means for settling round or elliptical shaped objects, such as tomatoes, potatoes, onions, lemons, citrus fruits, apples, or other manufactured items, fed by gravity to a container, being weighed, so as to eliminate unusually large voids therebetween and a high "crown"—in a container, of proper size for a predetermined content weight—that causes damage to the product when the cover or lid is closed thereupon.

The above objects may be broadly carried out by the provision of a mechanism including a feeding means which intermittently and successively feeds at least two containers, arranged in file, so that the forward of said containers is positioned at a filling-station comprising an article-flow control means and a weighing platform upon which the container rests; and, upon being filled and automatically weighed to a predetermined weight, the flow of the product is cut off by the movement of the scale and the filled and weighed container is shifted out of filling range by the movement of the feeding means, and, with the same latter movement, an empty succeeding container follows the filled container to take its place at said filling-station, the timing of this action being such that, preferably, the product is allowed to start its filling flow just before the empty container has reached its stopping point at the filling-station; and, further, the provision, where necessary or desirable, of means for vibrating the scale platform, while the containers are being filled, to settle the contents being discharged into the containers.

Other objects and features of the invention will be apparent from the following detailed description of one embodiment of the invention as now devised and used.

The invention resides in the organization and combination of the instrumentalities and in the specific construction and arrangement of parts hereinafter more fully described and illustrated, by way of example, in the accompanying drawings and more particularly pointed out in the appended claims.

In the drawings:

Figure 4 is a transverse sectional view of the apparatus taken substantially on line 4—4 of Figure 1;

Figure 5 is a transverse sectional view of the apparatus taken substantially on line 5—5 of Figure 1;

Figure 6 is an enlarged fragmentary sectional side elevation of a portion of the weighing scale to illustrate details of construction of the scale platform;

Figure 7 is a plan view of Figure 6;

Figure 8 is an enlarged fragmentary perspective view illustrating the construction of a corner of the supporting frame of the machine and the manner in which the reciprocating feeding means is mounted thereon;

Figure 9 is an enlarged fragmentary detail view illustrating the position and manner of actuating a limit switch controlling the box-feeding motor;

Figure 10 is an enlarged view of the filler-gate mechanism with parts broken away for clarity;

Figure 11 is an end view of Figure 10; and

Figure 1:
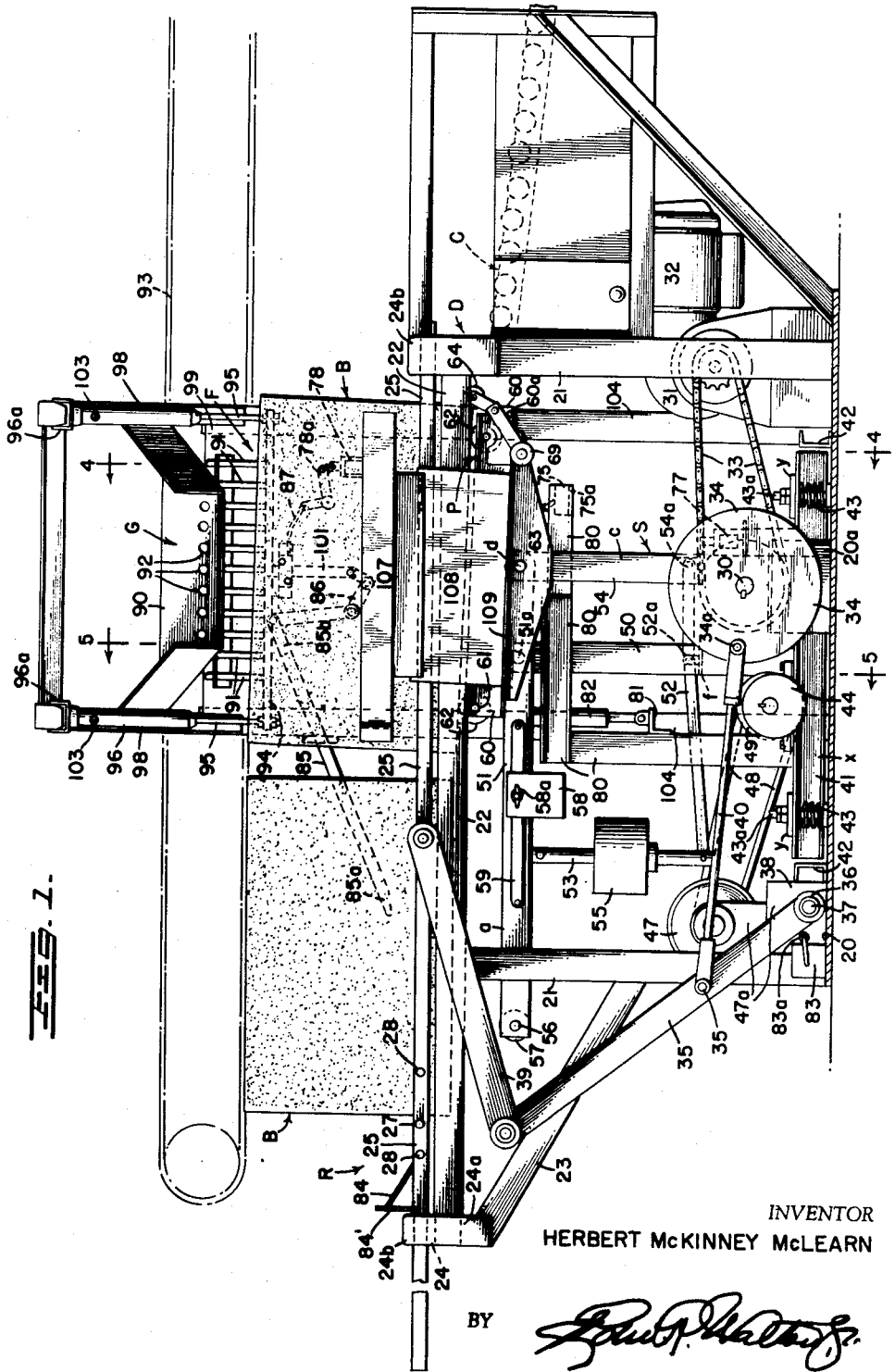
Figure 1 is a front side elevation of the filling-and-weighing apparatus with a box in position to be filled and with the parts of the apparatus shown in filling position.

Referring in detail to the drawings, in which like characters of reference refer to similar and like parts throughout the several views, the apparatus or machine of this invention embraces an organization having a scale or weighing mechanism S including a weighing platform P underlying a filling station F controlled by an overlying gate mechanism G, the filling station F being successively supplied with a box or other container B from a box receiving station R and which box, after being filled and weighed while at rest on said platform, causes the gate mechanism to cut off the flow of articles to the filling station, an empty box to be delivered at the filling station and the filled box to be moved off the weighing platform and discharged from the machine.

Such organization or combination of mechanisms, functioning as indicated, is at present embodied in a construction and assembly comprising a supporting frame which includes a rectangular base plate 20 (that may be omitted in some instances), having standards 21 secured to and rising from its four corner portions, and which includes two spaced and substantially parallel horizontal beams 22, each of which spans and is supported upon the upper ends of a pair of standards on each side of said base plate, respectively, defining the sides of a box-conveying passageway therebetween. The ends of the beams 27, at the box receiving end R of the passageway, preferably project for a distance beyond their adjacent standards 20 and are given support by diagonal brace member 23, while the other ends of the beams, at the discharge end D of the passageway, preferably terminate at their adjacent standards 20.

A spacer-block 24 is mounted on the upper surface of each beam 22 at each of its ends and is, preferably, in the form of an H-type fitting with its connecting web providing the spacer-block (see Fig. 8), the lower walls or legs 24ª serving to embrace the beam and its supporting standard 20 or brace 23 to which they may be welded or otherwise secured, while its upper walls and legs provide a guide channel 24ᵇ to slidably support a push-rod 25.

There are two such push-rods 25 disposed horizontally with one overlying each of said beams 22, respectively, and extending between and slidably supported in two of said channel guides 24ᵇ on one side of the machine. The push-rods 25 are reciprocated in unison lengthwise in their bearings 24ᵇ to feed boxes or other containers B from the receiving end R of the machine to its discharge end D onto a conveyor C, this being accomplished by providing a flat-bottomed trough-like member 26 spanning the beams 22 and extending longitudinally thereof from the receiving end R of the beams to, and slightly short of, the platform P at the filling station F, this trough member 26 providing a stationary box-receiving station R upon which boxes B are manually placed. The trough member 26 may be of a length to receive thereupon any desired number of boxes, but is here shown as dimensioned to receive one box, which is fed from the receiving station by a cross-rod 27 extending between the push-rods 25 to engage the box at its rear end and which box pushes any other boxes before it along the passageway from the discharge end D of the machine onto the conveyor C. Two or more holes 28 are provided at predetermined positions along the length of the push-rods 25 to receive the ends of the cross-rod 27 in order that it may be adjusted to accommodate boxes of different lengths.

In order to reciprocate the push-rod, in unison, a shaft 30, extending transversely of the machine and located under the platform P, is journalled at its end in bearing 29 mounted in bearing block 20ª secured to the base plate 20. The shaft is driven from a reduction gear assembly 31 of a motor 32, also secured on the base plate 20, by a sprocket chain 33 and has fast to each of its opposite ends a crank-disc 34, each crank-disc 34 being connected to the overlying push-rod 25 through a linkage. This linkage for each push-rod may be of the walking-beam type comprising a throw-lever 35 having one end pivoted, as at 36, to the base plate 20 (such as to an end of a shaft 37 disposed transversely of the machine and journalled in bearing brackets 38) and its other end connected to the adjacent push-rod by a pivoted link 39, each throw-lever 35 being connected to its adjacent crank-disc 34 by a pitman-rod 40. The crank pins 34ª and the pivotal pins 35ª, connecting the pitmans in each assembly, are placed or located in the same relation to each other on said crank-discs 34 and on said throw-levers 35, thereby effecting an identical reciprocal movement of the push-rods 25 in unison, the stroke of the push-rods 25 being such that a box, contacted by the cross-rod 27, will be moved forwardly from its position at the box receiving station R (shown in Fig. 3) completely into the filling station F, and will push the filled box (in front of it) onto the conveyor C, at which time the movement of the push-rods is reversed to bring the cross-rod 27 to the position shown in Figures 1 and 2.

The passageway, between the beams 22 through which the boxes B are conveyed by the movement of the push-rods 25, is floored at the filling-station F by a platform P which provides an extension of the trough member 26 and is the weighing platform of the scale mechanism S, of the Roberval-balance type.

The scale S is comprised of a supporting frame disposed on the base plate 20 somewhat centrally of the area between the standards 21 and below the beams 22. This scale supporting frame includes a base 41 mounted resiliently on the base plate 20 of the machine so as to permit it to be vibrated and is positioned between the bearing-block 20ª and spaced end-abutments 42, which limit excessive lateral movement of the scale base 41 at its sides and ends. As shown in Figures 4 and 5, the scale S may be fabricated of two pairs of coextensive and substantially parallel channel members x, each pair being spaced from the other pair to form the side members of the scale-base and connected together as a unit at each of their end-portions by plates y extending transversely of the members x and welded, or otherwise secured, thereto. The plates y have their ends projecting beyond the outer members x and rest upon coil compress springs 43 which resiliently support and maintain the scale-base 41 out of contact with base-plate 20 of the machine, the springs 43 being centered and held in place by a "hold-down" bolt-nut assembly 43ª projecting from the base-plate 20 through the projecting end of the end plates y of the scale-base 41 and carrying cooperating nuts on their extremities.

The scale-base 41 is vibrated by means of two eccentric fly-wheels 44 disposed on opposite sides of and approximately midway of the length of the scale-base and fast on the ends of a shaft 45, extending transversely of the scale-base (Fig. 5). The shaft 45 is journalled in pillow-blocks 46 mounted on a spacer-plate y' extending transversely of and secured to the scale-base 41. The shaft 45 is driven by a motor 47 mounted on a motor support 47ª carried by the base-plate 20 under the receiving end R of the machine and connected with the shaft 45 by a belt 48 passing over suitable sheaves 49 on the motor shaft and shaft 45. It will be noted that the only points of contact between the vibrating scale unit and the supporting frame of the machine (i.e., parts 20, 21 and 22) are through the coil springs 43 and their guide bolts 43ª.

As seen in Figures 4 and 5, each pair of channel members x of the scale-base 41 has its members x spaced apart to form an anchoring slot therebetween in which uprights are fixedly secured and extend upwardly therefrom; and, at substantially midway the length of and from each pair of channel members x, a post 50 rises. These spaced posts 50 are coextensive (see Figures 1, 2, 3 and 4) and provide the relatively stationary support for the two horizontal members 51 and 52 of a parallelogrammic "Roberval" balancing scale, and to which posts 50 and members 51 and 52 are pivoted on horizontal axes at points intermediate their ends, as at 51ª and 52ª, while the two vertical members 53 and 54 of said parallelogrammic scale are pivotally connected at their ends to said horizontal members 51 and 52.

The horizontal member 51 of the scale provides the scale-beam immediately underlying the box-passageway of the machine and comprises, preferably, a pair of spaced and parallel horizontal bars $a$ (see Figs. 4, 5 and 6) connected by spacer-bars $b$. The vertical member 54 of the Roberval-balance comprises two spaced and parallel bars $c$ pivoted at their upper ends to the extremities of the bars $a$, respectively, underlying the filling-station F. This pivotal connection may be provided by a transverse pivot-rod $d$ extending transversely of the beam member 51 and through the end of said bars $a$ and $c$. The lower ends of the bars $c$ of the member 54 are connected by a horizontal spacer bar $e$. The other vertical member 53 of the Roberval-balance is a single rod or bar connected at its upper end to the mid-portion of an overlying spacer-bar $b$ on the scale beam 51. The lower horizontal member 52 of the Roberval-balance comprises two links, one pivotally connected at its ends to the lower end of the member 53 and to a spacer-bar $f$ extending between the posts 50, respectively, and the other link pivotally connected at its ends to the spacer-bar $f$ and the spacer-bar $e$ of the member 54. A weight 55 is provided on the scale member 53 to counter the greater weight of the member 54 and the platform P. Also, the rear end of the scale-beam 51 may be extended beyond its connection with the member 53 and have a horizontal rod 56, extending between bar members $a$, to removably support additional weights 57 that may be conveniently added or removed to compensate for varying factors, such as varying weights of boxes and the like. A slidable weight 58 is provided for adjustment along the length of the scale bear 51 to one side of the fulcrum 51ª opposite that of the platform P, whereby the content-weight of boxes may be regulated or varied according to requirements.

The scale platform P, as mentioned above, forms a continuation of the feed-trough 26 at the filling-station F, but is disconnected therefrom, and is rigid with and disposed above the vertical stabilizing member 54 (see Figures 1, 2, 3, 4 and 5). The platform P is constructed very simply and comprises two horizontal substantially parallel side members 60, preferably of channel-form, extending in the same direction as the guide beams 22 of the machine frame and spaced apart sufficiently to approximately correspond with the width of the box-conveying passageway between said beams (see Figs. 4, 5, 6 and 7). These side members 60 are held in their spaced relation by a series of stay rods 61 extending transversely therebetween and secured thereto. Wheels 62 are axially journalled upon the stay rods 61 at spaced distances thereon and at staggered positions on adjacent rods and are of the same diameter to provide a supporting and roller-conveying surface at their upper peripheries in substantial alignment with the upper surface of the trough 26, when the platform is without weight thereon. Instead of having the wheels 62 journalled on the rods 61, they may be fast thereon and the ends of the rods 61 journalled in anti-frictional bearings on the side members 60.

Each side member 60 has a horizontal plate 63 secured to its lower and inner side, by welding or bolts, and extends below said members 60 (see Figs. 4, 6 and 7); and the upper ends of the spaced vertical arms $c$—forming the stabilizer member 54 of the scale—are each welded, or otherwise rigidly secured, to the adjacent plate 63 at the medial point in the length of the side member 60. It will be noted, particularly from Figure 6, that said arms $c$ are angled at about 88 degrees relative to the length of the plates 63 so that, when said arms are stabilized in a perpendicular position with respect to the horizontal, the platform P will have declination of about two degrees toward the discharge end D of the machine.

With the roller platform P pitched downward about two degrees at its discharge end, the boxes or other containers B have a tendency to roll off and discharge from the machine, when the platform is in its normal supporting position while the boxes are being filled. This is prevented by the provision of a roller-bar 64 (see Figs. 1, 2, 3, 6 and 7) mounted upon and extending across the discharge end of the platform P and biased to swing to and be locked in a normal position above the plane of the top-peripheral box-supporting portion of the wheels 62, thus obstructing a box from sliding off the platform and retaining it thereon, until the roller-bar 64 is released by the movement of the platform when the content of the box, being filled, has reached its proper weight.

Accordingly, the roller-bar 64 is rotatably mounted upon a rod 65 extending axially therethrough. The rod 65 is supported at its ends in the distal ends of link-arms 66 extending for the required distance from a shaft 67 to which they are fast. The shaft 67 extends across the discharge end of the platform P and is journalled at its ends in the side members 60 thereof. Also, fast to each end of the shaft 67 is an arm 68 angularly disposed with respect to its adjacent link-arm 66. The distal ends of the arms 68 carry a weight member 69, the disposition and angularity of which creates a bias to rotate the shaft 67 to swing the roller-bar 64 upwardly to its obstructing and box-retaining position. This biasing movement is limited, however, by stops 60ª on the side member 60 and engageable by the arm 68 in their downward movement to properly position lock-arm 70, laterally projecting from and fast to the shaft 67, for latching cooperation with an automatic latching device 71.

The automatic latching device locks the roller-bar 64 in its upper box-retaining position and, preferably, comprises a generally horizontally positioned elongated teeter-member 71 mounted on a rod 72 extending between and secured at its end to the side members 60 of the platform adjacent its discharge end. The teeter, member 71 is so positioned on the rod 72 as to have an inwardly or rearwardly longer and heavier trip-arm portion 71ª and a shorter and lighter latch-arm portion 71ᵇ; and the rod 72 is so positioned with respect to the lock-arm 70 that its latch-arm 71ᵇ will align in abutting engagement with the distal end of the lock-arm 70, when the roller-bar is in its box-retaining position, to prevent its movement from that position, as shown in Figs. 1, 2, 3, 6 and 7. The extremity of the lock-arm 70 is notched, as at 70ª, so as to receive a corner of the squared end of the latch-arm 71ᵇ (see Fig. 6), when the bar 64 is in its normal box-retaining position and the latch-arm 71ᵇ is swung upwardly from its release position by the heavier trip-arm 71ª. The downward movement of trip-arm 71ª is limited by an abutment 73 carried on a transverse spacer plate 74 extending between and secured to the side members 60 of the platform P.

A normally open electric switch 75 and an adjustable tappet 76 are mounted on an accessory supporting frame 80. The switch 75 is positioned to be engaged and closed by the spacer plate 74 of the platform P when the platform is depressed to a point of equilibrium of the scale S under the weight of the contents of the box B. The closing of switch 75 energizes a relay 32ª (Fig. 12) which starts the box-feeding motor 32 and a relay 76 that simultaneously activates two solenoids 77 and 78 (see Figs. 1, 2, 3, 6, 10, 11 and 12).

The solenoid 77 is securely mounted on a block 77ª secured to the base plate 20 and is connected to about the middle of the spacer bar $e$ of the stabilizing member 54 of the scale assembly S through a flexible link connection.

When energized, the solenoid 77 pulls the member 54 of the already balanced scale to the lowest point of its downward movement causing the trip-arm 71ª to contact an underlying adjustable tappet 79 on the accessory supporting frame 80 and thus move the extremity of the latch-arm 71ᵇ out of engagement with the lock-arm 70 of the box-retaining bar 64. Hence, the pressure of a filled box B on the declining platform P, against the retaining-bar 64, will overcome the resistance of its downweighted arms 69 and swing the retaining-bar 64 downwardly, whereby the filled box will move under its own momentum to discharge off the end D of the machine onto a conveyor C (see Fig. 3).

When the filled box B has moved past and cleared the retaining roller-bar 64, said bar 64 is swung upwardly by its biasing weights 69 to box-retaining position (see Figs. 1, 2, 6 and 7) to hold an oncoming empty box on the platform at the filling-station F, which movement brings the lock-arm 70 in position to be engaged by the latching arm 71$^b$ when the platform has raised sufficiently (the solenoid 77 having been de-energized at this time, as later explained) to move the trip-arm 71$^a$ out of contact with the tappet 79 and allow it to swing the latch-arm 71$^b$ upwardly in latching abutting contact with the notched end of the lock-arm 70. Thus it will be seen that the platform moves only in a vertical direction, which movement effects the starting of the box-feeding motor 32, the release of and retention of a box on the platform and the closing of the filling-gate G, which latter will be described later herein. Also, it will be seen that the box-retaining means 64 and the latching device 70—71 are part of the scale platform P and do not touch any part of the scale-base 41 until the desired weight has been reached and the scale switch 75 closed. Further, a dash-pot 82 is provided to control fluctuation in the scale-beam 51, when the latter is in balanced position, the dash-pot being secured to a bracket 82$^a$ carried by a spacer-member $b$ on the scale-beam 51 and having the stem of its dash member pivotally connected to a bracket 81 on the upright members of the accessory frame 80.

Figure 2:
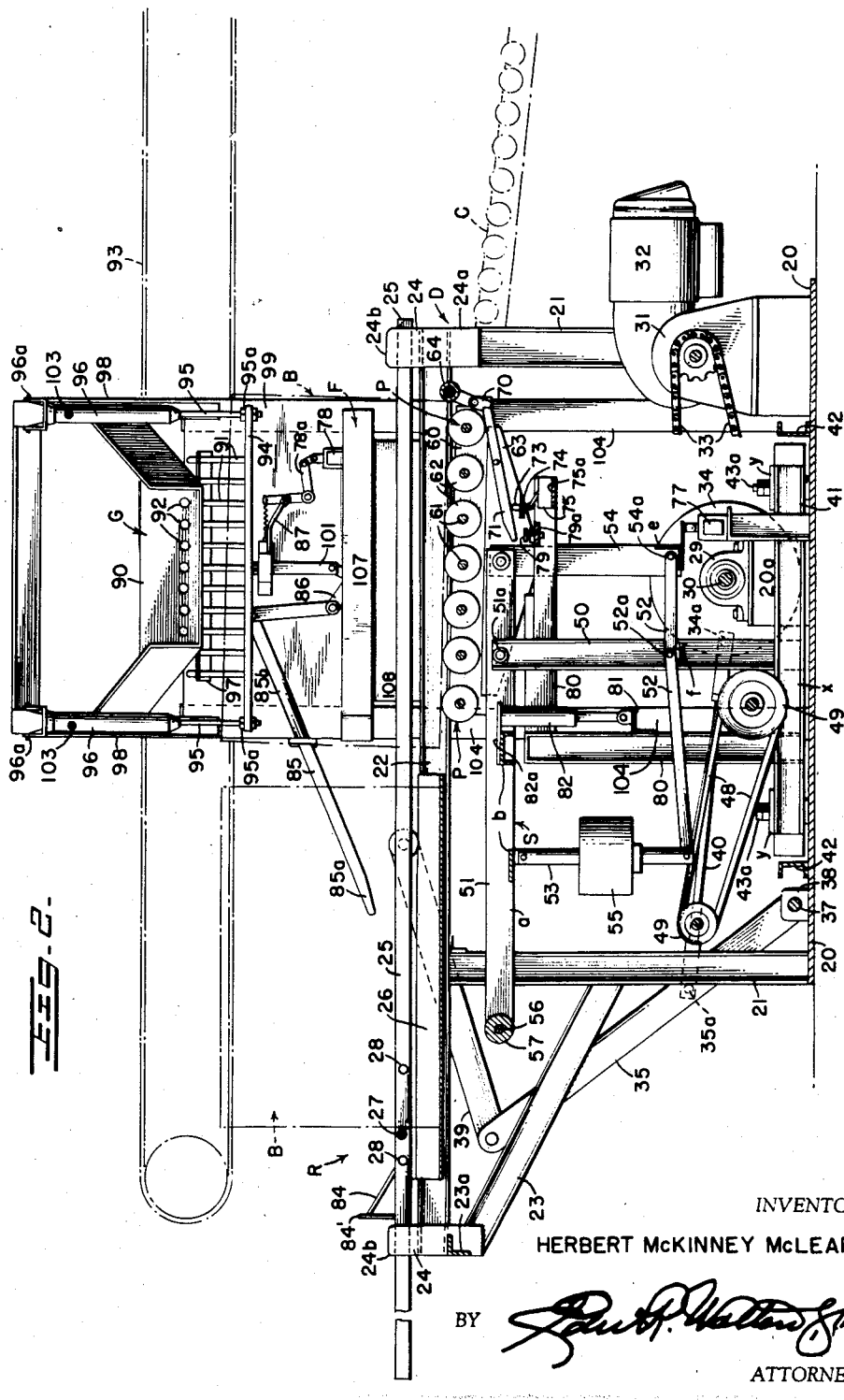
Figure 2 is a longitudinal sectional view through the apparatus as shown in Figure 1 and taken substantially on line 2—2 of Figure 4.
Figure 3:
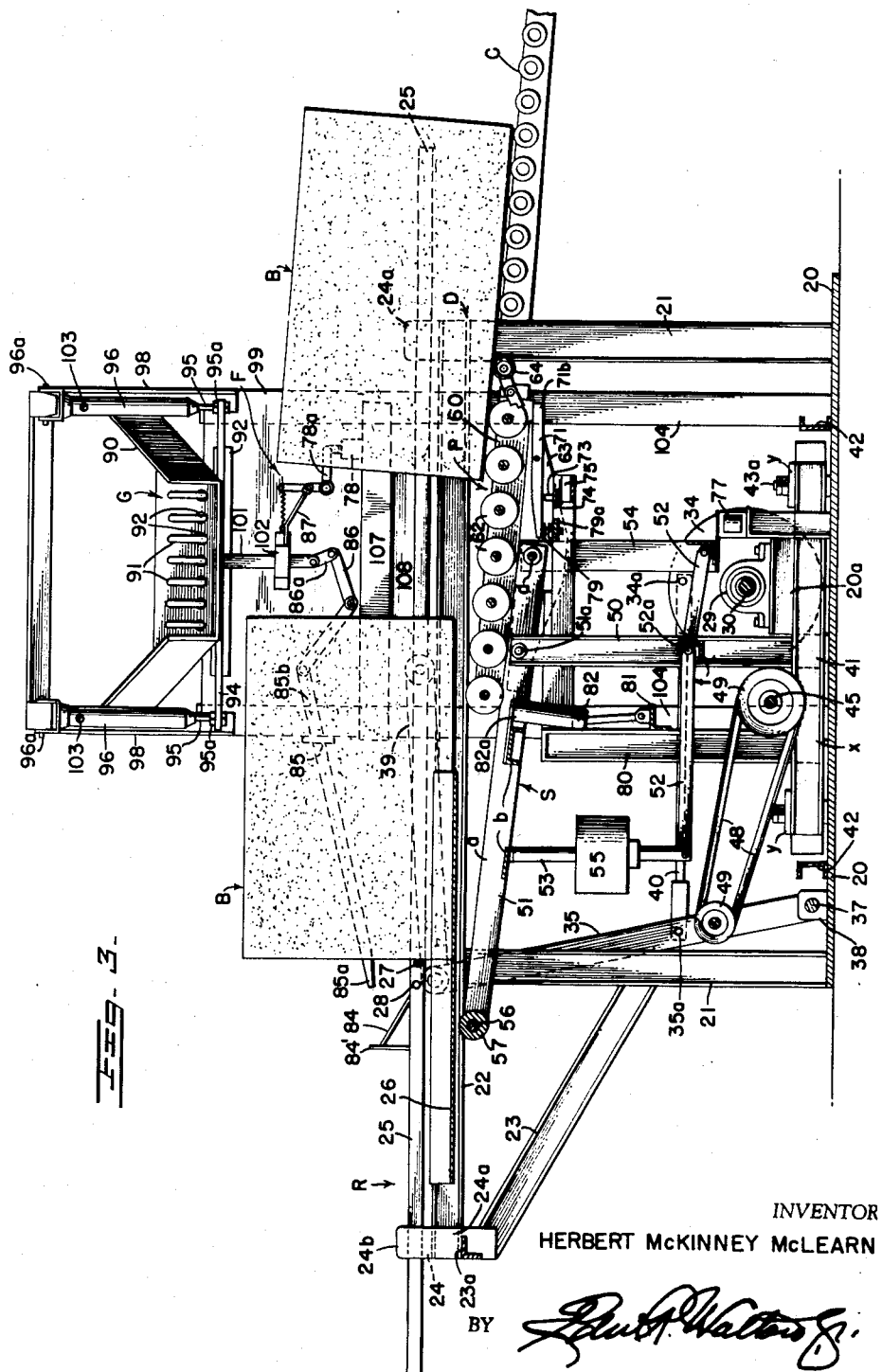
Figure 3 is a view similar to Figure 2 but showing the parts of the apparatus in the position they assume when the container has reached its proper content weight, the flow of the articles has been cut off, the filled box is in its movement off the weighing platform and a succeeding empty box is being advanced to filling position.

The filling-gate G is normally biased to closed position, as shown in Figs. 3 and 11, and is held in open position, shown in Figs. 1 and 2, by a lock-means 87 releasable by the energization of the solenoid 78, which is energized, as above stated, when the switch 75 is closed by the movement of the platform P. Thus, when a box B, being filled, has reached a predetermined weight and the platform depressed in the manner above described, the switch 75 immediately energizes the relays 32$^a$ and 76, the latter actuating solenoids 77 to unlatch the retaining bar 64 and solenoid 78 to unlatch the gate G to allow it to close while the former energizes the motor 32 to cause the push-rods 25 to move an empty box at the box-receiving station R to the filling-station F onto the scale platform P.

Since the solenoid 78 completes its function when the gate mechanism is unlatched and solenoid 77 completes its function when the box-retaining bar 64 is unlatched, after the filling and weighing of each container, it is only necessary that they be energized momentarily. To control the duration of operation of the solenoids 77 and 78, a limit switch 83, normally biased to open position, is located on the base plate 20 at the lower left-hand corner of the machine (Fig. 1) so that its actuating finger 83$^a$ will be contacted by the swinging lever 35, when the push-bars are at rest in their rear-most position, thus closing a holding circuit to the solenoid relay 76. Consequently, when the scale switch 75 is closed, as above stated, energizing the relays 32$^a$ and 76—and, hence, the solenoids 77 and 78 and starting the motor 32—the lever 35 will move away from the switch 83 and break the holding circuit to the solenoid relay 76, thus deactivating the solenoids 77 and 78; and the solenoids will remain inactive until the start of the next cycle.

As the push-rods 25 move forwardly feeding an empty box to the filling-station F, the gate means G is moved to open position from its closed position by the movement of the push-rods 25 at a time just before the push-rods come to the end of their box feeding movement, so as to allow the filling of a box at the filling station to commence before the box comes to rest on the platform. Accordingly, an inclined cam surface 84 is provided on the rear-end portion of one of the push-rods to engage with the free end 85$^a$ of an intermediately fulcrumed and slideable lever 85, normally disposed in the path of said inclined cam surface, to raise the end 85$^a$, which, at the proper time, is engaged by the abutment 84' and pushes the lever 85 lengthwise for a distance in the forward feeding movement of the push-rods. The other end 85$^b$ of said lever, being connected by a linkage 86, withdraws the fingers 91 downwardly through the openings 92 in the discharge end of the chute 90 to open the gate G which is held in open position by a spring-pressed detent 87 (see Fig. 10).

Figure 12:
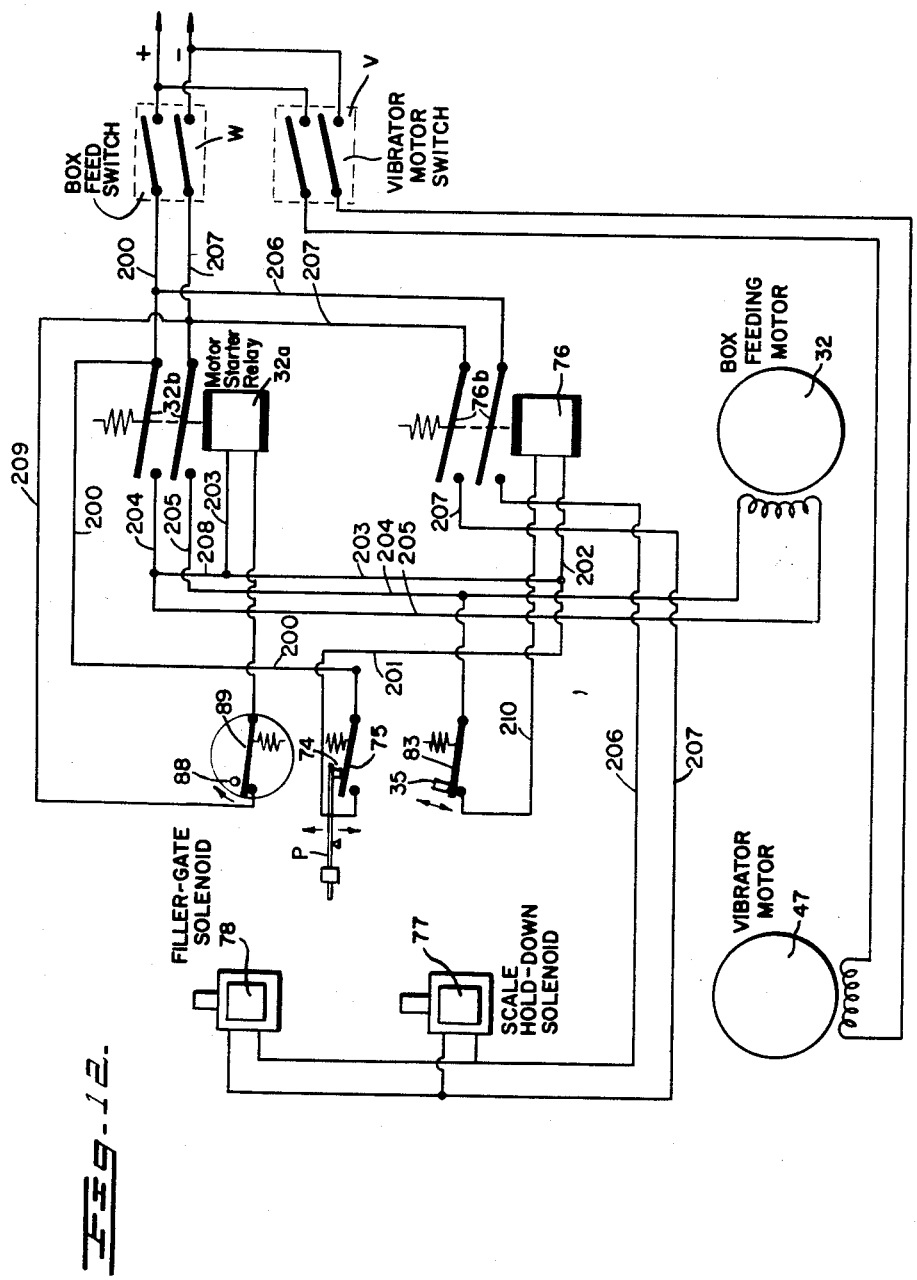
Figure 12 is a wiring diagram of a control circuit for the apparatus.

Upon the completion of the forward feeding movement of the push-rods 25, a linkage drive 34—40—35—39 is such as to immediately move the push-rods 25 in an opposite direction to assume their initial position, shown in Figs. 1 and 2; and as the push-rods approach their rear-most position during each complete cycle of their movement, a trip-pin 88 (see Fig. 9) on one of the crank discs 34 strikes the actuating finger 89$^a$ of a normally biased closed switch 89 in a holding circuit of the relay 32$^a$, thereby opening the switch 89 and de-energizing the feed motor 32. The position of the trip pin 88 is such that, after it strikes the switch finger 89$^a$, it will be moved beyond the switch finger by the override of the motor 32 (as shown in Figs. 9 and 12) thereby allowing switch 89 to close under its bias and, at about the same time, the push-rods 25 and throw-lever 35 will stop at their rear-most position, shown in Figs. 1 and 2, closing switch 83, at which time an attendant will place another box on the trough 26 at the receiving-station R forwardly of the cross-rod or pin 27 for another cycle of operation. Of course, it is to be understood that it is possible, where desired, to feed a continuous line of empty boxes onto the trough member 26 at the receiving station, in which case retractible dog means (not shown) may be used, in place of the push rod cross-pins 27, to feed and index the boxes to the filling station.

The filling gate G may, and preferably does, take the form of a chute 90 having side walls converging toward its discharge end which is opened and closed by a plurality of vertically spaced fingers 91 which are projected and retracted through enlarged openings 92 in the bottom of the chute, this chute being positioned alongside of a distributing belt 93 equipped with a diverter (not shown) to discharge the produce or articles, from said belt, laterally into the chute. The fingers 91 are carried on a horizontal bar or cross-head 94 adjustably suspended, at its ends as at 94$^a$, from two spaced vertical plungers 95 each contained in a cylinder 96, respectively, on opposite sides of the chute. A stationary guide-plate 97 is disposed below the chute and provided with openings through which the fingers reciprocate to keep them in aligned position. The upper ends of the cylinders 96 support hingedly, as at 96$^a$, two vertically disposed brackets 98 carried, preferably, at the upper corners of a vertically positioned plate member 99. Compression springs 100 are disposed in the cylinders 96 and surround the stems of the plungers 95 with their ends bearing against the heads of the plungers and the bottoms of the cylinders, these acting to project the fingers 91 through the openings 92 to close the discharge end of the chute 90. The gate supporting plate 99 is mounted on the upper end portions of two spaced vertical standards 104 rising from the back side portion of the base plate 20 of the machine. The supporting plate 99 is secured to the standards 104 by bolts 105 extending through vertically elongated slots 106 in the plate so that the plate 99 may be elevated or lowered to adjust it with respect to a distributing belt 93 from which articles are transferred to the chute 90.

Depending from and rigid with the medial portion of the cross-head 94 is a draw-bar 101 slidably mounted in a bearing bracket 102 for vertical movement therein. The free or distal end of the draw-bar 101 is connected to one end of a bell-crank lever 86 by a link 86ª, the other end of the bell-crank lever 86 being connected with the end 85ᵇ of gate opening lever 85, previously described. This linkage is such, as can be seen from Fig. 10, that when the lever 86 is actuated by the cam 84, it will withdraw the fingers 91 downwardly through the openings 92 in the chute 90 and allow articles to flow therefrom. When the fingers 91 have been fully withdrawn, the spring press detent 87, which is slidably mounted in the bracket 102 and bears against the draw-bar 101, is moved into a lock-hole 101ª in the upper portion of the draw bar 101, thus holding the gate in this open position. As indicated above, the detent 87 is withdrawn from the lock-hole 101ª, when the solenoid 78 is energized by the downward movement of the platform P, through means of a bell-crank lever 78ª connected to the armature of said solenoid with the free end of said detent, at which time the finger-gate 91 is projected upwardly to closed position by the spring-loaded plungers 95. It is preferable that the cylinder 96 be of the pneumatic compression type so as to control the upward surge of the closing movement of the gate 91; and, to this end, the upper ends, at least, of the cylinder are closed and the air compress therein, by said closing movement, is controlled by adjustable air vents 103 to regulate the speed of said closing movement.

It is preferred to provide a pair of guides 107 for guiding the boxes B into and from the scale platform P and these guides are horizontal elongated members spaced apart sufficiently to be slightly spaced from the opposite side walls of the box and positioned midway of the height of the box. The guides 107 are, also, flared outwardly at their rear ends to facilitate and direct the entrance of the boxes between the guides from the wider stationary trough 26. Since these guides are part of the scale platform P and should not come in contact with any part of the supporting frame of the machine and the push-rods, they are supported in position by angular shield plates 108, to which they are welded or otherwise secured, and which shield plates are supported by a laterally projecting flange plate 109 projecting outwardly from each of the platform side members 60. The shield plates 108 are adjustably secured to the flange plates 109 by means of bolts 110 extending through elongated slots 111 in the flange plates (see Fig. 7) which permit lateral adjustment of the shield plates 108.

*Operation*

In the use of the machine of this invention, the machine is located, as shown in Figures 1 and 2, to receive the product, to be packed, from a distributing belt or other means 93; and an empty box B is placed upon the platform P, as shown, in position to receive products flowing from the chute 90 of the gate mechanism G and another box is placed on the trough 26 in the box-feeding passageway with its rear end against and forwardly of the cross-rod 27 of the push-rods 25. In cases where hinged covered boxes are used, the hinged side of the box should be placed on the front side of the passageway so that the hinged cover will lie somewhat extended from the forward side of the passageway. When properly placed in position, as just stated, the adjacent ends of the boxes should have at least an inch of space between them in order that the box being filled and weighed will not touch the succeeding empty box on the stationary trough 26.

Assuming that the parts of the machine are in the position shown in Figures 1 and 2—that is, after the completion of one cycle of the machine and ready to start another cycle—the chute 90 will be open with the fingers 91 of the gate withdrawn below the chute to allow the flow of articles over the chute from the distributing belt 93 into the box B resting on the platform P at the filling station F. Should, for any reason, the finger-gate 91 be in closed position as shown in Figures 3 and 10, it may be moved to open position by manually operating the lever 85 to lower the finger-gate to open position. Also, at or prior to this time, the scale unit may be adjusted for use in connection with a box of a specific weight in addition to the weight of the contents to be received in the box, as well as any funnel that may be used in connection with the filling of the box. This adjustment may be made by adding or removing weights 57 or by applying or removing them from the top of weight 55. A closer adjustment to the correct weight may be made by the slidable weight 58 to which access is readily had at the front of the machine.

Now being ready to start the filling operation, the switch V (Figure 12) is actuated to energize the circuit to the vibrating motor 47. This switch is independent of the box feed switch W because, in some instances, it may not be desirable or necessary to vibrate the weighing mechanism, although in most instances it is desirable to do so. The box feed switch W is then closed to condition the control circuit, shown in Figure 12, and the distributor belt is set in motion by other means or, if a distributor belt is not employed, the product to be packed is caused to flow to the chute 90, from which it passes into the box at the filling-station F, by lifting the gate-opening-lever 85 manually to open the finger-gate 91. This having been done, the electrical conductor 200 (Fig. 12) is now charged. However, it will be noted that in this condition of the circuit, the switches 83 and 89 are closed but the scale-activated switch 75 is open.

When the box at the filling-station F becomes filled and the predetermined amount of the product therein has been reached, the platform P of the scale mechanism S will move downwardly and the bar 74 (Figs. 2 and 3) will contact the normally opened scale-activated switch 75 and thereby close the same and energize the relays 32a and 76 through conductors 201, 202 and 203, which relays, respectively and simultaneously, close their switches 32x and 76x which, in turn, energize the box-feeding motor 32 (through conductors 204 and 205) and the solenoids 77 and 78 (through conductors 206 and 207). The closing of switch 32x establishes a holding-circuit for relay 32a through "jump" conductor 208 connecting conductors 204 and 203. It will be noted that the switches 89 and 83 are now closed and are disposed in the return conductors 209—207 and 210—205 of their respective circuits. The energization of solenoid 78 immediately withdraws the detent 87 from its latching position allowing the spring-loaded cylinders 96 to project the fingers 91 through the openings 92 in the chute, thereby cutting off flow of the product to the box at the filling station.

The energization of solenoid 77 causes the platform end of the scale beam 51 to move downwardly to a point where the trip arm 71ª of latch bar 71 contacts the tappet 79, moving the latching end 71ᵇ of the latch bar downwardly out of engagement with the lock-arm 70 of the box retainer bar 64, which latter, under the pressure of the filled box B due to the inclination of the platform P, will swing downwardly (see Fig. 3) and allow the filled box to move off the platform P through the discharge end of the machine onto the conveyor C.

Also, the energization of the box-feeding motor 32 (which, as above stated, was simultaneous with the energization of the solenoids 77 and 78) causes the push-rods 25 to feed the next succeeding box from the trough 26 onto the platform P. If, for any reason, the filled box does not shift freely under its own weight from the platform, as just mentioned, it will be nudged by the oncoming fed empty box to discharge onto the conveyor C.

Immediately upon the commencement of the feeding of the empty box to the filling-station, the feed-actuating link 35 will be moved out of engagement with the limit switch 83, which it previously closed, and, since this limit switch 83 is biased to open, and is in series with one side of the electric circuit feeding solenoid-relay 76 (see Fig. 12), it will break the circuit of the solenoid-relay 76 and thereby deactivate solenoids 77 and 78 even though the activating switch 75 remains closed until a loaded box B has moved off the platform P.

Also, as the empty box B is being fed from the receiving-station R to the filling-station F, the cam 84, on one of the push-rods 25, engages and raises the trip end 85a of the gate-opening lever 85 and its end abutment 84' pushes the lever 85, thereby operating the bell-crank linkage 86 to withdraw the gate fingers 91 downwardly to their open position shown in Figures 1 and 2, hence allowing the product to again flow from the chute 90 into the box now moved into position on the weighing platform P at the filling-station F. The gate 91 is held in its withdrawn or open position by the spring-pressed detent 87. Since the cyclic movement of the push-rods 25 is one complete back-and-forth movement, they will be immediately withdrawn to their rearmost position, as soon as an empty box B has been pushed upon the weighing-platform P in filling position, and will be stopped from further movement by the actuating pin 88 opening the limit switch 89 (Figs. 4, 9 and 12) in the holding circuits 204—208—203—209—207 of the motor-starter relay 32e, the rods and their actuating linkage coming to a stop at their rearmost position at which point one of the links 35 engages the open limit switch 83 (normally biased to open position) and closes the conditioning circuit to the solenoid-relay 76 for the next repeated cycle of operation. At this time, with the feeding mechanism of the machine at rest, the attendant places another empty box on the trough 26 at the box-receiving station R against and in advance of the cross-rod 27 connecting the push-rods 25, this happening while the box on the scale-platform P is being filled and the operation of the machine, above described, continues automatically until the switch W is opened or the last box B fed at the receiving station R has been filled, weighed and delivered to the conveyor C.

When filling a box at the filling-station F, it may be desirable, with some types of product, to place a funnel-type frame (not shown) about the rim of the box to positively direct the product into the box being filled as well as to avoid unnecessary spill-overs.

It will thus be seen that a very rugged filling and weighing machine is provided which will withstand natural abuses encountered in high-speed volume filling and weighing, yet relatively simple in construction and adjustable to requirements; that the scale mechanism S is sturdy to withstand continuous vibration and is of the Roberval type, insuring weighing of the product being packed under vibrating conditions; and that the machine has distinct advantages in its adaptability to almost any size or design of container used in the packing industry, in the use of the feeding linkage 35—39—40 providing an increase and decrease in acceleration of the box movement, in the push-rod means 25 which feeds an empty box into position and on retraction of the bars will leave the box on the scale platform without anything else touching it, in the scale platform P being declined toward the discharge end of the machine so that a box will more easily move therefrom or be pushed thereof, in directly cutting off the flow of the product at the moment the correct weight of the filled box has been reached, in the provision of pneumatically regulatable closing means for closing the finger-gate when released so as to reduce to a minimum injury to the product, and in the reduction of time the gate is held closed before again opening to discharge the product into an empty box at the filling station.

Having thus described the invention in the manner in which the same is to be performed, it is to be understood that the invention is not to be limited to the exact construction and arrangement of parts herein shown and described, as the same may be varied or modified within the scope of this invention, and that the invention is only to be limited by the scope of the appended claims.

That which is claimed, as new and to be secured by Letters Patent is:

1. In a packing apparatus for filling containers and weighing the same, a container receiving station, a container filling station and a filled-container discharge exit on the apparatus; a substantially horizontal supporting surface at the receiving station upon which empty containers may be supported adjacent to the filling station; the weighing platform at the filling station forming a continuation of said supporting surface; a weighing scale mechanism supporting the platform; a container feeding means movable to and fro along said supporting surface for successively moving a container from said supporting surface onto said platform during one of its to-and-fro movements; means for actuating said container feeding means, feed control means positioned to be operated by the feeding means to stop the operation of said actuating means when said feeding means is returned to its initial feeding position relative to said supporting surface; a filler-gate mechanism arranged to discharge into a container at the filling-station and having an actuating part positioned to be actuated by the movement of said feeding means to open said gate at a predetermined point in its movement of feeding an empty container to said platform; and gate control means connected with said gate mechanism to actuate it to close position and connected with said feeding actuating means and positioned to be actuated by the movement of said platform, under the weight of the contents within the container being filled and when a predetermined weight has been reached, to cause said feeding means to advance an empty box from the receiving station to the filling station and the filled box at the filling station to discharge from said platform through said exit of the apparatus.

2. The subject-matter of claim 1, wherein the platform declines from the horizontal whereby a container may discharge therefrom by gravity, an operable means on said platform for retaining a container on said platform and biased normally to container retaining position, releasable lock-means normally maintaining said retaining means in retaining position, and means responsive to the movement of said scale mechanism for releasing said lock-means when said container has been filled to said predetermined weight.

3. The subject-matter of claim 1 further characterized by said container-feeding means including a reciprocating member mounted to traverse the container supporting surface at said receiving station and which feeds on one stroke thereof an empty container to said platform and returns upon its other stroke to engage an empty box and including a driving means between said prime mover and said member, and wherein said feed control means is actuated by the movement of said driving means to discontinue the operation of said prime mover when said reciprocating member has reached the end of its return stroke.

4. The subject-matter of claim 3 wherein the said driving means comprises a driven crank and pitman, said pitman being connected to a pivoted throw-lever linked to said reciprocating feed member.

5. The subject-matter of claim 1 wherein the filler mechanism includes a delivery chute having apertures in its discharge end, vertically movable fingers forming a gate member mounted to be projected upwardly through said apertures to closed position across the discharge end of said chute, spring-loaded dash-pot means connected with and biased to move said gate to closed position responsive to said weighing movement of said platform and having adjustable vents to regulate its closing movement, and wherein the means actuating the gate to open position includes a linkage connected with said gate and having a portion thereof engageable by said container feeding means at a predetermined time in its movement to lower said gate to open position.

6. In a packing apparatus for filling and weighing containers, a container receiving-station, a container filling-station and a filled container discharge exit on the apparatus; a weighing scale mechanism including a weighing platform positioned at the filling-station to receive containers from the receiving-station; a container-feeding means for moving intermittently and successively a container from said receiving-station to said platform; a controlled filler-gate mechanism at the filling-station and disposed to discharge articles into the container, means actuated by the movement of said scale mechanism, when a predetermined weight has been reached, for discontinuing the flow of articles to the container on said platform and to initiate the next feeding movement of said container-feeding means, said platform declining sufficiently from the horizontal toward said discharge exit to cause the filled container to slide off said platform, a container retaining device carried at the lower end of said platform and biased to normal retaining position for obstructing the discharge movement of the container thereon and including means to automatically lock the same in retaining position; and a trip member positioned on the apparatus to release said lock means, when said container has been filled to a predetermined weight.

7. In an apparatus for filling containers and weighing the same, a weighing scale mechanism including a weighing platform adapted to support thereon a container to be filled and having its supporting surface declined to permit a filled container thereon to slide thereoff, a container retaining device carried at the lower end of said platform and mounted for movement into and out of container-retaining position and normally biased to retaining position for obstructing the discharge movement of the container thereon and including means to latch it automatically in its retaining position, and a trip member on said apparatus positioned to release said latch means upon movement of said scale mechanism when said container has been filled to a predetermined weight.

8. In an apparatus for filling containers and weighing the same, a weighing scale mechanism including a weighing platform adapted to support thereon a container to be filled and having its supporting surface declined to permit a filled container thereon to slide thereoff, a retaining bar swingably mounted on the platform and disposed at the declined end thereof and biased to swing above and across said end portion of said supporting surface of the platform to retain a container thereon, a latch-engaging member movable with said swingable bar, a latch device movably mounted on the platform and positioned and biased to normally engage said latch-engaging member to lock said retaining bar in its container-retaining position, and a relatively stationary abutment on said apparatus adapted to be engaged by said latch device to disengage said latch-engaging member, when said platform has been moved in its weighing movement for a predetermined distance, whereby pressure from the filled container on the platform will swing said retaining bar downwardly out of container-retaining position and permit the filled container to move off the platform.

9. In an apparatus for filling containers and weighing the same, a container receiving station and a filling-station on the apparatus, a supporting surface at the receiving station to support a container, a weighing platform at the filling station and arranged to receive and support a container slid thereon from said supporting surface, a scale mechanism supporting said platform, a container-feeding mechanism comprising a pair of spaced horizontal bars reciprocally mounted on opposite sides of said supporting surface to move an empty container therefrom onto said platform upon one stroke of its movement and having adjustable means to engage a container on said receiving station and actuating means for reciprocating said bars; said weighing platform comprising a roller-surface declined toward its discharge end, and a releasable means at the discharge end of said platform for normally retaining a container fed thereon and having a part actuatable by the movement of the scale mechanism to release a filled container and permit it to move off of said platform.

10. In an apparatus for filling containers having a filling station, a filler-gate mechanism at the filling-station for controlling the flow of relatively large discrete articles therethrough and comprising a chute having a series of spaced apertures therein extending across its discharge end, a plurality of spaced vertically disposed fingers positioned and mounted for vertical movement through said apertures, spring-loaded dash-pot means connected with and biased to normally project said finger upwardly to close and obstruct the flow of articles from said chute and having adjustable means to regulate the rate of the closing movement of said fingers, means for retracting said fingers downwardly through said openings below the conveying surface of said chute to open the same, means for latching said fingers in their retracted position, and means for releasing said latch.

11. In an apparatus for filling containers having a filling-station, a filler-gate mechanism at the filling-station and disposed above a container thereat and including a chute, a plurality of spaced vertically disposed fingers positioned at the discharge end of said chute and mounted for vertical movement, spring-loaded means normally biased to project said fingers upwardly to obstruct the discharge from said chute, means for retracting said fingers to open the chute, and means for latching said fingers in their retracted position; means for feeding a container to said filling-station, a weighing mechanism at the filling-station to support a container, and a control device for releasing said latching means when a predetermined weight has been reached upon said weighing mechanism, said finger-retracting means including a part positioned to be engaged by said container feeding means at a predetermined point in its feeding movement to actuate said retracting means.

12. The subject matter of claim 11 further characterized by said finger-retracting means comprising an operable linkage having a part thereof, which is positioned in the path of movement of a cam-surface on said container-feeding means and disposed to be engaged by said cam-surface, at a predetermined point in its feeding movement, to actuate said retracting means.

13. The subject-matter of claim 11 wherein the spring-loaded means comprises a plunger and cylinder assembly having a spring on one side of said plunger and the cylinder being closed on the other side of said plunger and controlled by an adjustable venting means, there being two such assemblies supporting a crosshead from which said fingers extend.

14. In combination with a packing apparatus, for filling containers with discrete articles and weighing the filled container, having a supporting frame, a filling-station, a container-supporting surface forming a receiving station, a feeding device positioned and mounted for to-and-fro movement for feeding a container from the receiving station to said filling-station and including a prime mover therefor and a weighing-scale mechanism supporting a weighing platform positioned to receive a container from said receiving station and mounted for vibratory movement; of means positioned to be actuated by said movement of said feeding device to stop the operation of said prime mover when said feeding device is returned to said receiving station, means actuated by the movement of said scale mechanism for initiating the movement of said prime mover when the contents of the container being filled have reached a predetermined weight, a filler-mechanism at the filling-station and disposed above a container on said platform and including a chute and a vertically movable gate disposed at the discharge end of said chute for controlling the discharge of articles into said container and biasing means normally urging said gate upwardly to closed position; means for lowering said gate from its closed position to open position and actuated by the movement of said feeding device at a predetermined point in its said movement when a container is being fed into position on said platform under said filling means and including means to hold said gate in open position against its bias, means actuated by the movement of said scale mechanism when a predetermined weight has been reached within the container to release said gate-holding means to cause said gate to close under its bias; and means for vibrating said platform optionally, while the container is being filled; all being mounted on said supporting frame.

References Cited in the file of this patent

UNITED STATES PATENTS

| | | |
|---|---|---|
| 860,877 | Mitchell | July 22, 1907 |
| 1,087,078 | Bond | Feb. 10, 1914 |
| 1,192,852 | Bruton | Aug. 1, 1916 |
| 1,729,991 | Bond | Oct. 1, 1929 |
| 1,751,487 | McIntyre | Mar. 25, 1930 |
| 2,385,233 | Robinson | Sept. 18, 1945 |
| 2,419,217 | Isenberg | Apr. 22, 1947 |
| 2,603,443 | Miller | July 15, 1952 |
| 2,711,245 | Taylor | June 21, 1955 |